April 5, 1960 P. E. HUMPHREY 2,931,092
CROSS SPRING FLEXURE PIVOT AND PROCESS OF MAKING THE SAME
Filed Jan. 14, 1957 2 Sheets-Sheet 1
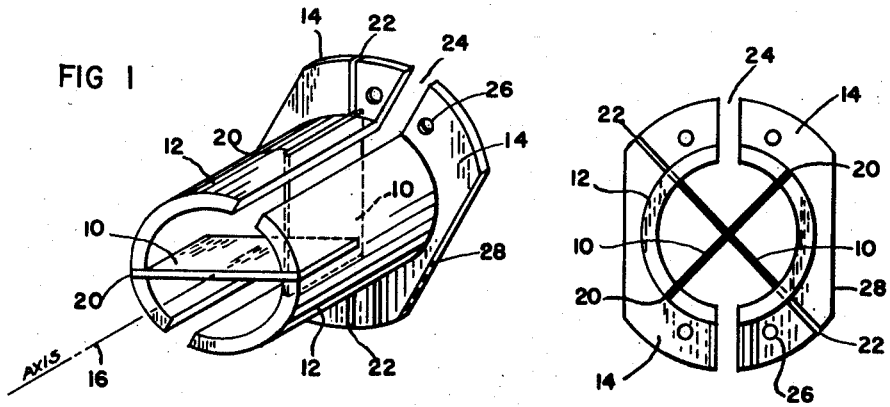
FIG 1
FIG 2
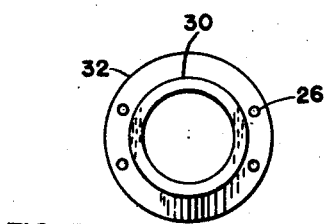
FIG 3
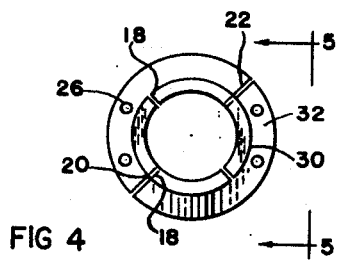
FIG 4
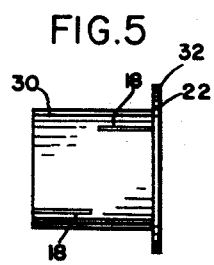
FIG. 5
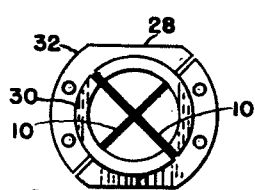
FIG 6
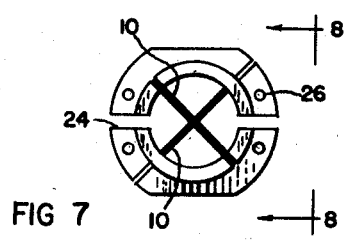
FIG 7
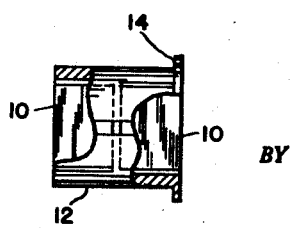
FIG 8
*INVENTOR.*
PAUL E. HUMPHREY
BY
*Knox & Knox*

April 5, 1960 P. E. HUMPHREY 2,931,092
CROSS SPRING FLEXURE PIVOT AND PROCESS OF MAKING THE SAME
Filed Jan. 14, 1957 2 Sheets-Sheet 2
FIG 9
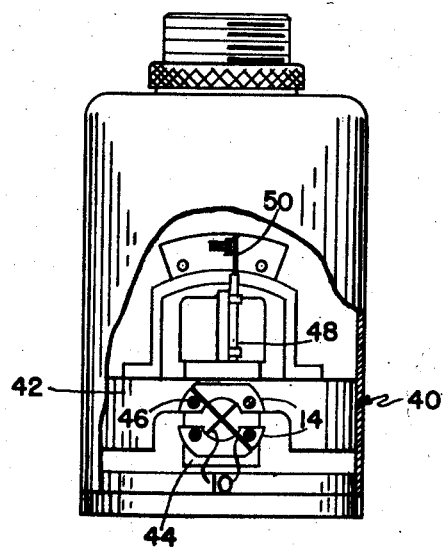
FIG 10
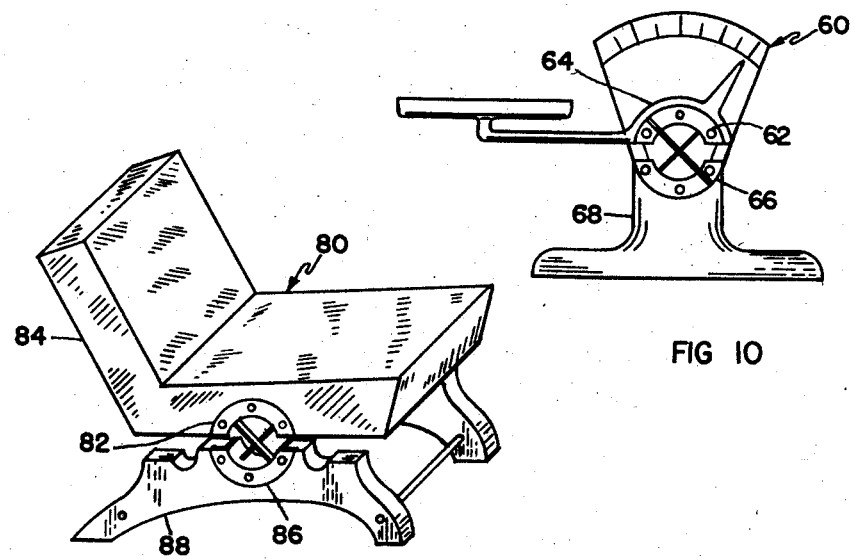
FIG 11
INVENTOR.
PAUL E. HUMPHREY
BY
*Knox & Knox*

United States Patent Office 2,931,092
Patented Apr. 5, 1960

2,931,092

CROSS SPRING FLEXURE PIVOT AND PROCESS OF MAKING THE SAME

Paul E. Humphrey, San Diego, Calif.

Application January 14, 1957, Serial No. 634,003

4 Claims. (Cl. 29—149.5)

The present invention relates generally to a method or process of making a spring suspension means, and more particularly a cross-spring flexure pivot.

The primary object of this invention is to provide a method of making a flexure pivot which is of unitary construction, there being a complete absence of screws and the like in the flexure pivot per se, thus assuring against loosening or maladjustment of the parts of the pivot during use, even in installations where strong vibrations and shock are encountered.

An object ancillary to the preceding object is to provide a method of making a flexure pivot characterized by a substantially linear spring rate.

Another object of this invention is to provide a method of making a flexure pivot which maintains an assured, symmetrical support at the rotational or rocking axis, a feature which is inherent in the unitary construction of the pivot, the pivot having a fixed instant center when subjected to angular displacements within the limits of the structure and therefore well adapted for use in precision instruments.

Another object of this invention is to provide a method of making a flexure pivot functional as a bearing and simultaneously functional as a biasing means, for use in installations wherein conventional types of bearing combined with springs have been found unsuitable especially with respect to securing a linear spring rate, examples of fields of use wherein this feature is important being the illustrated rate gyroscope and like instruments, and the illustrated weight measuring scales.

Yet another object of this invention is to provide a method of making a flexure pivot which is completely self-contained, easily and directly securable to the parts to be connected, so that this flexure pivot is well adapted for diverse uses including furniture having rocking or pivotally adjustable elements.

Finally, an object of this invention of paramount importance is to provide a process of making a flexure pivot which will carry out all the purposes in the foregoing objects, greatly facilitate and hasten the actual manufacture of such a pivot, and assure against non-uniformity in the pivots produced, and also avoiding non-uniformity as a result of maladjustment, and this process also provides for accurate preadjustment of the spring rate by final grinding of the spring elements, an operation which is not feasible with conventional or prior art flexure pivots.

With these objects definitely in view, along with other objects which will appear hereinafter as reflected by the advantages over other pivots which will be recounted later in this specification, this invention consists in the novel construction, combination and arrangement of elements and portions, as will be hereinafter fully described in the specification, particularly pointed out in the claims, and illustrated in the drawings which form a material part of this disclosure, and in which:

Figure 1 is an isometric view of the flexure pivot;

Figure 2 is an end elevational view of a flexure pivot;

Figure 3 is an end elevational view of the initial, undivided ring, and this figure, together with Figures 4–8, are proposed as illustrating the steps in the process of making this flexure pivot;

Figure 4 is a view, similar to Figure 3, but showing another step of the process, namely, the provision of slots in diametrically disposed pairs, the ring being still undivided;

Figure 5 is a side elevational view of the ring, at the same stage of construction as that illustrated in Figure 4, this Figure 5 being taken from the viewpoint indicated at 5—5 in Figure 4.

Figure 6 is a similar end elevational view, this figure being designed to indicate the next step in the process, namely, the insertion of the spring elements so that the ends thereof are bonded in the slots provided in the preceding step, this view also indicating that the flange on the ring can also be provided with flats, it being noted that this provision of flats can be accomplished earlier or later in the process or even deleted altogether in certain circumstances;

Figure 7 is an end elevational view, similar to Figure 6 and showing the next step in the process which is the parting of the ring into two hemi-cylindrical members;

Figure 8 is a view showing the structure of Figure 7, the view being taken from a line indicated at 8—8 in Figure 7, certain portions being broken away and other portions being shown in vertical section, to facilitate a complete illustration of the relationship of the parts;

Figure 9 is a side elevational view of a rate gyroscope wherein this invention is embodied as a means for supporting the member carrying the gyroscopic wheel, portions of the instrument being broken away to show the underlying portions and to facilitate the illustration of the relationship of the parts;

Figure 10 is an elevational view of a weight measuring scale embodying this invention; and Figure 11 is a view of an article of furniture, isometric in character, and proposed as showing how this invention can be adapted to such articles.

Similar characters of reference indicate similar or identical elements and portions throughout the specification and throughout the different views in the drawing.

Referring now to the drawings in detail, this invention has as its principal parts a pair of similar spring elements 10, a corresponding pair of similar members 12 and attaching flanges 14 on the last mentioned members. As illustrated, the members 12 are hemi-cylindrical in general conformation but it is conceived that these members may be of various configurations, and as will be clearly disclosed hereinafter, these members may be properly thought of as opposed portions of a single block of rigid material with a central opening or space therebetween such as would be the direct result of parting such a hollow block of material. However, for purposes of illustration, this invention will be primarily described herein as having hemi-cylindrical members 12 as shown, since this form is a truly illustrative embodiment of the instant invention.

The flexure pivot, as best illustrated in Figure 1, is substantially symmetrical about an axis indicated at 16 and extending transversely through the centers of the spring elements 10. The spring elements, as illustrated, are of flat, reed type and will be formed as nearly identical to each other as is practical, in the initial construction of the device. Two pairs of diametrically aligned slots 18 are provided by sawing or otherwise, in each end of the member 12. These slots 18 extend axially of the members 12 to approximately the center thereof, and are disposed normal to each other, all as clearly illustrated in Figures 4 and 5. The spring elements are disposed in crossed relation with the members 12, and the ends of the spring elements are inserted in the slots 18 and are unitized with the members 12.

The utilizing of the spring elements 10 and the members 12 may be accomplished by welding, brazing or an analogous procedure, as will be referred to again in a later part of this disclosure. It is noteworthy that the extensions 22 of certain of the slots 18 are merely incidental to the process used in the manufacture of this flexure pivot. These extensions 22 occurring in the attaching flanges 14 and having no essential function, although the process is simplified when the parting of the attaching flange 14 can be tolerated. The flanges 14 are necessarily parted as at 24, and the members 12 are similarly parted or spaced, and the sole connection of the members 12 is by virtue of the spring elements 10 spanning the space therebetween. Apertures 26 are provided in the attaching flanges 14, to receive screws whereby the pivot is mounted on the structure wherein the same is to be used, such as the rate gyroscope fragmentarily illustrated in Figure 9, and in this instance, flats 28 are provided on the attaching flanges 14 in the interest of saving space.

Coming now to the process of making the instant cross-spring flexure, the first step is the providing of a single block of material with a central opening to accommodate the spring elements. If reference be had to Figure 3, such a single block will be noted as illustrated in the figure as of hollow cylindrical form or ring-shaped. This ring 30, ordinarily of metal, may be formed with an attaching flange 32 in undivided form and apertures 26 can conveniently be provided in the flange 32 at this stage of the process. The next principal step in the process is represented in the Figures 4 and 5 and consists in the provision of the diametrically opposed slots 18, there being two pairs of such slots required. The depth of the slots 18 may be substantially one-half of the axial length of the ring 30, and the slots are sawed or otherwise cut into the ring from the ends thereof, the continuous flange 32 being also severed as indicated at 22. The next principal step is the insertion of the reed-like spring elements 10 with the ends 20 thereof in the slots 18, as illustrated in Figure 6, and the unitizing of these ends 20 with the ring 30, by some such process as welding or brazing. The next step is the parting of the ring 30 and the flange 32 into two hemi-cylindrical members which have been hereinbefore identified by the numerals 14, 14. This parting is accomplished by sawing or milling procedures and the plane of parting is such that two of said ends 20 are disposed on each side of this plane. The next step is the heat treatment of the unitized assembly to provide for the required spring characteristics in the elements 10. The provision of flats 28 is often desirable but the timing of this step is not considered particularly critical to the process. The final principal step of the process is the adjustment of the spring rate of the flexure pivot by grinding the exposed edges of the spring elements 10, that is, the edges of the spring elements at the ends of the flexure pivot. It will be obvious that grinding the edges of the spring elements will proportionately decrease the spring rate and a very accurate adjustment thereof can be attained.

The advantages of the above described flexure pivot and the process of making the same will now be more evident in the light of the foregoing description. It will be obvious that the pivots constructed as described will permit exact alignment of joined units such as is necessary in a rate gyroscope, illustrated in Figure 9. This instrument, indicated generally by the numeral 40, requires that a frame portion 42 thereof have mounted thereon a gimbal 44 to carry the gyroscopic wheel, not illustrated, of the device. The instant flexure pivot supplants the conventionally used separate gimbal and restraining springs which cannot afford a strictly linear spring rate. The instant flexure pivot, on the other hand, provides for a linear restraint to relative movement of the frame 42 and member 44 about the displacement axis of the gyroscope, the pivot occupying minimum space and providing maximum possible strength. Further, since there are no screws or other connections in the pivot per se, there can be no possible loosening within the pivot and no possible shift of the rotational or rocking axis, and there is no hysteresis in the joints provided by the instant pivot. Another advantage which will now be evident is that the units joined by this flexure pivot will be automatically perfectly aligned if the seats for the pivot are properly prepared in these units. This last advantage will be self evident in such environments at the rate gyroscope and the weight scales indicated in Figure 10, and in regard to the latter, the lack of frictional restraint and the provision of truly linear restraint in the pivot is of course of paramount importance. An advantage stemming directly from the novel process used in manufacturing this pivot is the assurance against any possible distortion of the pivot by the necessary heat treatment, since the final heat treatment is accomplished after the ring is parted, and the importance of this last mentioned feature can hardly be over-emphasized.

It should be noted that the screws 46, indicated in Figure 9, are used to secure the pivot to the units being joined thereby, and these screws should not be confused in any way with screws in prior art devices used to secure the springs to the portions of such pivots. By way of further explanation, the member 44 is represented as having an arm 48 which carries a wiper 50 of a potentiometer, and it is conceived that some such similar arrangement of elements will always be present when this pivot is used in instruments of this character, but the field of use of the pivot is extremely wide. For example, a weighing scale 60 may have an upper member 62, similar to the already mentioned member 14, secured to the unit carrying the pan and indicator assembly 64, while the lower member 66, also somewhat similar to the above described numbers 14, is suitably secured to the base assembly 68. It is also conceived that this flexure unit may find acceptance in fields foreign to precision instruments, scales and the like, and an article of furniture 80 is indicated in Figure 11 with this flexure pivot mounted on and between relatively moving parts. More specifically, an upper member 82 is represented as secured in any suitable manner to the seat assembly 84 of a reclining chair, while the lower member 86 is secured to the base assembly 88. Of course, absolute linearity of spring rate is unnecessary in such an environment, but the fact that the flexure pivots can be constructed cheaply and accurately makes their use in such articles of furniture extremely attractive since the tendency for the pivoted element to sag in one direction is practically eliminated. Attachment flanges of pivots used for such articles possibly will not require to have the flats 28 provided thereon and many minor variations may be made in the pivots to suit the same to their diverse uses. In this latter connection, it is urged that the shape of the original block or ring can be varied considerably, as can the shape of the spring elements. One such shape of the spring leaves is achieved by notching the same at the adjacent edges thereof so that the spring leaves nest together to permit a shortening of the flexure pivot as to axial length. It is also conceived that the spring elements may be positioned other than normal to each other, and the final grinding to adjust the spring rate can obviously be omitted in certain instances. Other variations will occur to those skilled in the art to which this invention appertains, and the present disclosure, with regard to both the drawings and the specification, should be considered as merely illustrative rather than limiting.

I claim:

1. The process of making a cross spring flexure pivot comprising the following consecutive steps: providing a single block of material with a central opening and a pair of aligned slots on opposite sides of the opening and another pair of aligned slots on opposite sides of the opening and disposed normal to the first mentioned pair; inserting similar spring elements in crossed relation into the opening with the ends of said elements in opposed slots; unitizing the block with said ends; parting the block diametrically and in an axial direction into two spaced portions so that two of said ends are symmetrically disposed on each side of the plane of parting; and heat treating the unitized assembly to give the spring elements optimum spring characteristics.

2. The process of making a cross spring flexure pivot comprising the following consecutive steps: providing a ring with pairs of diametrically opposed slots; inserting the ends of similar spring elements into said slots with the spring elements crossed at the axis of the ring; unitizing the ring and said ends; parting the ring diametrically and in an axial direction into two spaced portions so that two of said ends are on each side of the plane of parting; and heat treating the unitized assembly to give the spring elements maximum spring characteristics.

3. The process of making a cross spring flexure pivot comprising the following consecutive steps: providing a hollow cylindrical body with diametrically opposed pairs of slots in each end thereof, extending axially inwardly of the body and normal to each other; inserting similar spring elements in crossed relation into the opening with the ends of said elements in opposed slots; unitizing the block with said ends; parting the block diametrically and in an axial direction into two spaced portions so that two of said ends are on each side of the plane of parting; and heat treating the unitized assembly to give the spring elements maximum spring characteristics.

4. The process of making a cross spring flexure pivot comprising the following consecutive steps: providing a hollow cylindrical body with diametrically opposed pairs of slots in each end thereof, extending axially inwardly of the body and normal to each other; inserting similar spring elements in crossed relation into the opening with the ends of said elements in opposed slots; unitizing the block with said ends; parting the block diametrically and in an axial direction into two spaced portions so that two of said ends are on each side of the plane of parting; heat treating the unitized assembly to give the spring elements maximum spring characteristics; and then grinding the outer end edges of the spring elements to adjust the spring rate of the flexure pivot to the desired value.

References Cited in the file of this patent

UNITED STATES PATENTS

| | | |
|---|---|---|
| 2,319,740 | Lapsley et al. | May 18, 1943 |
| 2,382,245 | McCormack | Aug. 14, 1945 |
| 2,480,114 | Bradbury | Aug. 30, 1949 |
| 2,611,659 | Hadley | Sept. 23, 1952 |
| 2,735,731 | Freebairn et al. | Feb. 21, 1956 |